United States Patent
Salter et al.

(10) Patent No.: US 10,769,874 B2
(45) Date of Patent: Sep. 8, 2020

(54) VARIABLE HEIGHT EXTERIOR KEYPAD

(71) Applicant: Ford Global Technologies, LLC, Dearborn, MI (US)

(72) Inventors: Stuart Salter, White Lake, MI (US); Kristopher Brown, Dearborn, MI (US); David Brian Glickman, Southfield, MI (US); Paul Kenneth Dellock, Northville, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/216,380

(22) Filed: Dec. 11, 2018

(65) Prior Publication Data
US 2020/0184751 A1  Jun. 11, 2020

(51) Int. Cl.
  *C07C 9/00* (2006.01)
  *G06F 3/041* (2006.01)
  *G07C 9/33* (2020.01)
  *G07C 9/00* (2020.01)

(52) U.S. Cl.
  CPC ....... *G07C 9/00563* (2013.01); *G06F 3/0416* (2013.01); *G07C 9/00658* (2013.01); *G07C 9/33* (2020.01); *G07C 2209/63* (2013.01)

(58) Field of Classification Search
  CPC ............ G07C 9/00563; G07C 9/00142; G07C 9/00658; G07C 2209/63; G07C 9/33; G06F 3/0416
  See application file for complete search history.

(56) References Cited

U.S. PATENT DOCUMENTS

| | | | |
|---|---|---|---|
| 5,644,119 A | 7/1997 | Padula et al. | |
| 7,248,151 B2 | 7/2007 | McCall | |
| 8,994,495 B2 | 3/2015 | Dassanayake et al. | |
| 9,910,489 B2 | 3/2018 | Reymann et al. | |
| 2011/0090097 A1* | 4/2011 | Beshke | B60R 25/23 341/20 |
| 2011/0174926 A1* | 7/2011 | Margis | B60N 3/004 244/118.6 |
| 2014/0015637 A1* | 1/2014 | Dassanayake | G07C 9/00174 340/5.54 |
| 2015/0045988 A1* | 2/2015 | Gusikhin | B60R 16/037 701/2 |
| 2016/0110966 A1 | 4/2016 | Lutz | |
| 2016/0132104 A1* | 5/2016 | Reymann | G06F 3/011 345/173 |

FOREIGN PATENT DOCUMENTS

WO  WO-2018053357 A1 *  3/2018  ............ G06F 3/011

OTHER PUBLICATIONS

DeMuro, Doug. "Why Ford's Keypad Entry System Is Secretly The Best Thing Ever." Published Jul. 28, 2015. Jalopnik. Retrieved from https://jalopnik.com/why-ford-s-keypad-entry-system-is-secretly-the-best-thi-1720567933.

* cited by examiner

*Primary Examiner* — Mohamed Barakat
(74) *Attorney, Agent, or Firm* — David Coppiellie; Carlson, Gaskey & Olds, P.C.

(57) ABSTRACT

A vehicle access control system is disclosed and includes a touch sensitive display for generating an input image and controller configured to control the input image generated on the touch sensitive display responsive to information regarding a height of an operator. The system controls a lock actuatable responsive a signal from the controller.

12 Claims, 4 Drawing Sheets

US 10,769,874 B2

VARIABLE HEIGHT EXTERIOR KEYPAD

TECHNICAL FIELD

This disclosure relates to an external keypad that controls access to a motor vehicle.

BACKGROUND

A door lock for a motor vehicle can include an external keypad for entering of a pass code. The external keypad has traditionally been located next to a door handle of the vehicle. However, the height of the door handle is not arranged to provide optimal viewing and input to a keypad. Moreover, advances in touch screen technology have made externally accessible input displays a practical option. Ergonomic and security factors with regard to operator size and viewing angles enhance or detract consumer experience and acceptance.

Motor vehicle manufactures continually seek to improve and maintain consumer satisfaction and interest in new vehicles.

SUMMARY

An external keypad for a vehicle according to an exemplary aspect of the present disclosure includes, among other things, a display accessible from an external surface of the vehicle and a controller receiving information indicative of a characteristic of an operator, wherein the controller governs operation of an input image generated on the display in response to the received information indicative of a characteristic of the operator and generates an access signal responsive to a predefined code input onto the input image.

In a further non-limiting embodiment of the foregoing external keypad, the input image is a keypad generated on the display.

In a further non-limiting embodiment of any of the foregoing external keypads, the keypad is generated with alphanumeric characters disposed in a non-sequential order.

In a further non-limiting embodiment of any of the foregoing external keypads, the keypad is generated with alphanumeric characters positioned in a non-rectilinear shape.

In a further non-limiting embodiment of any of the foregoing external keypads, the keypad includes alphanumeric characters and at least one blank key.

In a further non-limiting embodiment of any of the foregoing external keypads, each key of the keypad includes a background color and an alphanumeric color that are selectable by the operator for reducing observability of a code input into the keypad other than the operator inputting a code.

In a further non-limiting embodiment of any of the foregoing external keypads, a height of the input image is adjusted according to the information indicative of the characteristic of the operator.

In a further non-limiting embodiment of any of the foregoing external keypads, the characteristic of the operator is a height of the operator.

In a further non-limiting embodiment of any of the foregoing external keypads, the controller determines an area of a high response on the display and an area of low response and determines the height of the operator based on a ratio between the high response and the low response.

In a further non-limiting embodiment of any of the foregoing external keypads, the controller receives an image of an operator's face and determines a height of the operator based on the image of the operator's face.

A vehicle access control system according to another exemplary aspect of the present disclosure includes, among other things, a touch sensitive display configured for generating an input image, a controller configured to control the input image generated on the touch sensitive display responsive to information regarding a height of an operator, and a lock actuatable responsive a signal from the controller.

In a further non-limiting embodiment of the foregoing vehicle access control system, the input image is a keypad and the controller controls a height of the input image on the touch sensitive display based on a height of the operator.

In a further non-limiting embodiment of any of the foregoing vehicle access control systems, the keypad is generated to include alphanumeric characters disposed in at least one of a non-sequential order, a non-rectilinear shape and/or to include at least one blank key.

In a further non-limiting embodiment of the foregoing vehicle access control system, each key of the keypad includes a background color and a character color that are selectable for reducing undesired observance of input into the keypad.

In a further non-limiting embodiment of the foregoing vehicle access control system, the controller determines an area of a high response on the display and an area of low response and determines the height of the operator based on a ratio between the high response and the low response.

A method of authorizing access to a vehicle according to another exemplary aspect of the present disclosure includes, among other things, mounting a touch sensitive display in a location accessible from an exterior of the vehicle, generating an input image on the touch sensitive display with a controller responsive to information regarding a height of an operator and enabling access to the vehicle responsive to inputting a proper code into the input image.

In a further non-limiting embodiment of the foregoing method, an area of high contact on the display and an area of low contact is determined and the height of the operator is determined based on a hand shadow ratio between the area of high contact and the area of low contact.

In a further non-limiting embodiment of any of the foregoing methods, the input image is generated on the display based on the height of the operator corresponding with the hand shadow ratio.

In a further non-limiting embodiment of any of the foregoing methods, the input image is generated to include alphanumeric characters disposed in at least one of a non-sequential order, a non-rectilinear shape and/or to include at least one blank key.

In a further non-limiting embodiment of any of the foregoing methods, the input image is generated to include a keypad that includes a background color and a character color that are selectable for reducing undesired observance of input into the keypad.

The various features and advantages of this disclosure will become apparent to those skilled in the art from the following detailed description. The drawings that accompany the detailed description can be briefly described as follows.

DETAILED DESCRIPTION

Figure 1:
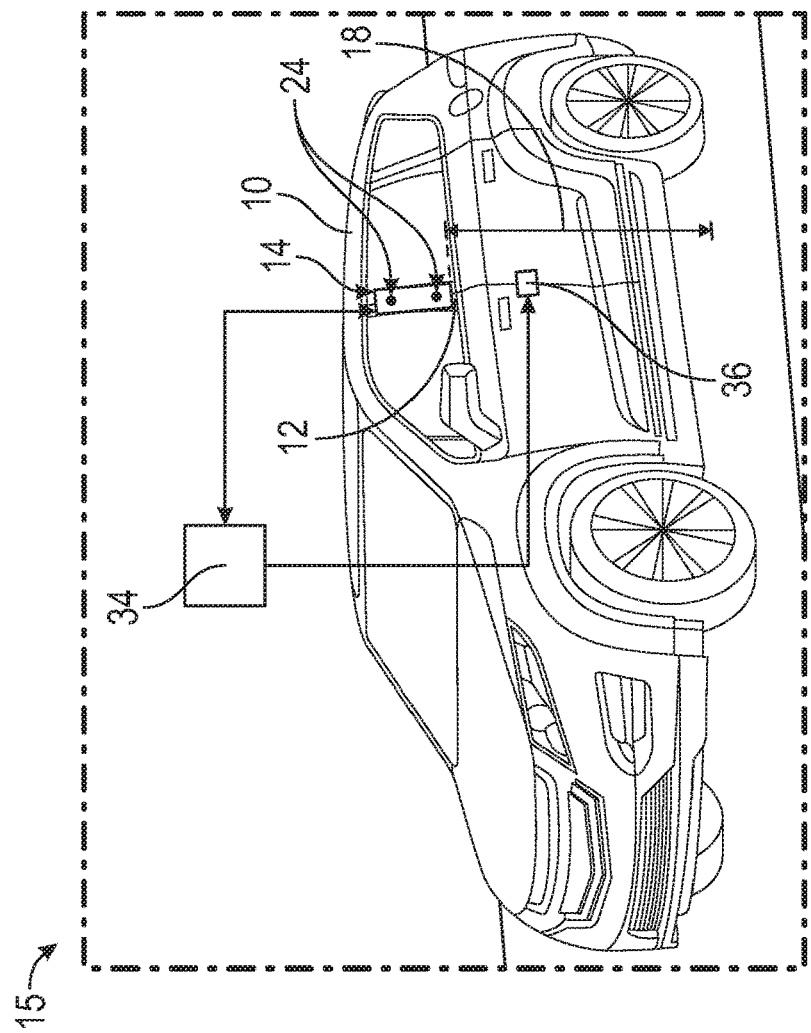
FIG. 1 is a schematic view of a vehicle including an access control system with an externally accessible touch sensitive display.

Referring to FIG. 1, an example vehicle 10 includes an access control system 15 that controls operation of at least one lock 36. The example access control system 15 includes a touch sensitive display 14 mounted to an external surface 12 of the vehicle. The display 14 is orientated on the vehicle 10 such that an operator can input information that is utilized to authorize access to the vehicle 10. The display 14 may be a capacitive touch display or other known touch sensitive display operated by a user interacting with visual elements and images provided on the display 14.

The touch sensitive display 14 is in communication with a controller 34. The controller 34 may be part of a vehicle control module or a standalone controller for the access control system 15. Moreover, it is within the contemplation of this disclosure that the controller 34 is implemented as a software program stored as part of a vehicle controller.

The controller 34 controls operation of the display 14 and also will send signals to vehicle security devices such as, for example, the lock 36. Accordingly, the display 14 is part of an access control system for the vehicle 10 that enables access to the vehicle responsive to input of a proper code. Cameras 24 may be orientated relative to the example display 14 to obtain images of an operator that are utilized to tailor input images generated on the display 14 to physical characteristics of the individual operator. The disclosed access control system 15 tailors input images generated on the display to operator specific characteristics to improve the operational experience and enhance privacy.

Figure 2:
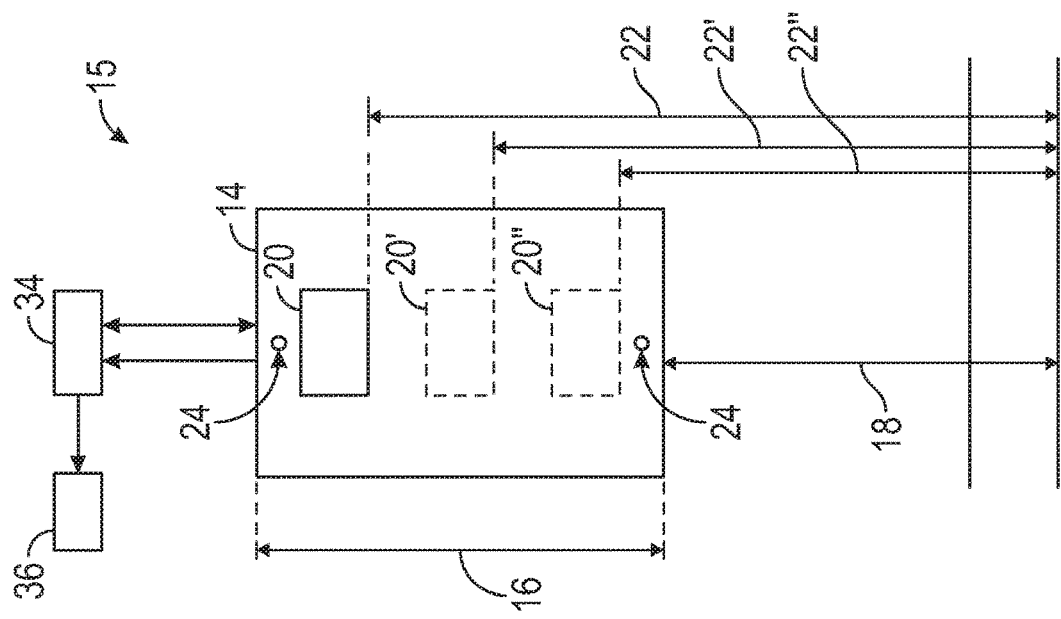
FIG. 2 is a schematic representation of input images generated on the example touch sensitive display.

Referring to FIG. 2 with continued reference to FIG. 1, the example display 14 includes a height 16. The height 16 enables an input image 20 to be positioned at various heights. The example system 15 obtains information indicative of a specific physical characteristic of an operator and uses that characteristic to tailor the position of the input image 20. In one disclosed example, the input image 20 is displayed at a specific height 22 relative to the ground to provide an optimal orientation of the input image 20 with respect to the specific physical characteristics of the operator. In one example, the input image 20 is disposed at a height 22 above the ground. In another example, an input image 20' is disposed at a height 22' above the ground. In still another example, an input image 20" is disposed at a height 22" above the ground. Each of the input image heights 22, 22' and 22" are adapted to the specific operator to provide an optimal location of the input image 20 relative to the physical characteristics of the operator to both aid and input information into the input image 20 and also to provide a location of the input image 20 that deters detection of an input code by others surrounding or observing the input. It should be appreciated, that although three different heights 22, 22' and 22" are disclosed by way of example, the height is not limited to certain positions, but is instead determined based on a determination of the height of an operator.

Figure 3:
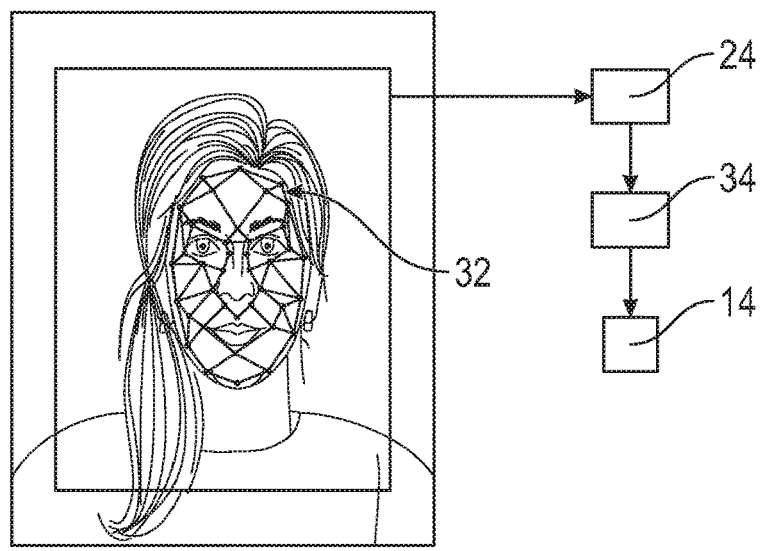
FIG. 3 is a schematic view of an example image capture system.

Referring to FIG. 3 with continued reference to FIGS. 1 and 2, in one example embodiment, the cameras 24 are utilized to capture an image 32 of the operator. The image 32 is analyzed to determine physical characteristics of the operator including a height of the operator relative to the ground and the display 14. The information regarding the height of the operator is utilized by the controller 34 to determine and instruct the height of the input image 20 generated on the display 14. The height of the operator is determined utilizing the facial recognition as well as visual cues to determine an approximate height of the operator. Once the approximate height of the operator is understood, the controller 34 will instruct the display 14 as to a desired location of the input image 20.

The height of the input image 20 can be predefined for specific ranges of operator heights to provide an optimal location. The height of the input image 20 on the display 14 is determined based on ergonomic factors for each height of the operator. The ergonomic factors considered include readability of the display as well as comfort when inputting codes into the display.

Moreover, privacy is considered and factored into the determination of the height of the input image 20 generated on the display. In some instances, an outside observer may be able directly observe the passcode. In other instances, the passcode can be determined by observation of movements of the operator while inputting a passcode. The example discloses access control system 15 includes features that discourage and prevent direct observation or determination of passcodes.

Although cameras 24 are disclosed, other example means of determining physical characteristic of an operator are incorporated as part of the example access control system 15. In one example disclosed embodiment, an initial touch of the display 14 is utilized to ascertain certain operator characteristics.

Figure 4:
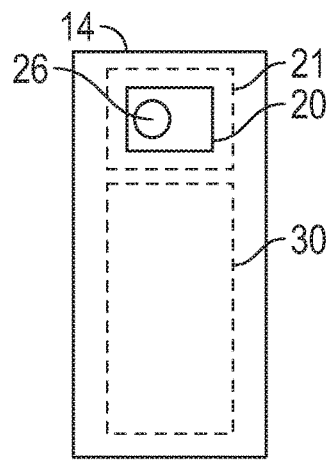
FIG. 4 is a front schematic view of high and low contact regions on the example touch sensitive display.

Referring to FIG. 4, the display 14 is shown schematically and an initial touch by an operator is schematically indicated at 26. In this example, the initial touch 26 is utilized to determine a physical characteristic of an operator. The determined physical characteristic is then utilized to determine the proper position of the input image 20.

Upon the initial input contact 26 with the display 14, the controller 34 will determine a region on the touch sensitive display 14 of high contact schematically shown at 28. The controller 34 will also determine a region of low contact schematically shown at 30. Operation of a touch sensitive display is subject to a hand shadow effect. The hand naturally generates a region of high contact proximate the area of the initial touch. An area under the operator's hand that is not used to contact the display forms the low contact area referred to as the hand shadow. A relationship between the high contact area and the low contact area can be utilized to determine an approximate height of an operator.

Accordingly, the regions of high contact 28 and low contact 30 are indicative of a height or stature of the operator providing input to the display 14. When an operator touches the touch sensitive display 14, the hand shadowing effect is present. Upon the initial touch by an operator indicated at 26, a high contact area schematically shown at 28 will be determined. The other regions that are covered or shadowed by the hand, schematically indicated at 30, are the lower contact region. A ratio of the contact region 28 in view of the low contact region 30 is utilized to determine an approximate height of the operator.

Accordingly, in one example embodiment, a ratio of the area of high contact 28 to an area of low contact 30 is compared to known values that correspond with an approximate height of an operator. Those known values are utilized to determine the height of the operator and position the input image 20.

Figure 5:
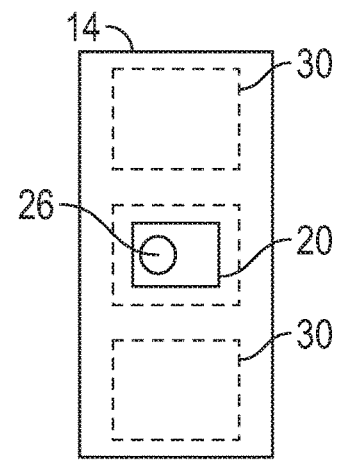
FIG. 5 is a front view of another set of high and low contact regions on the example touch sensitive display.

Referring to FIG. 5, in another example embodiment, the initial touch 26 is shown at a different height and a first high contact area 28 is schematically shown between low contact areas 30. The ratio of the location of the initial touch 26 along with the determination of the high contact and low contact areas 30 are compared to known ratios that correspond with an approximate range of heights of an operator. The approximated height of an operator is then utilized by the controller 34 to position the input image 20 on the display 14.

Figure 6:
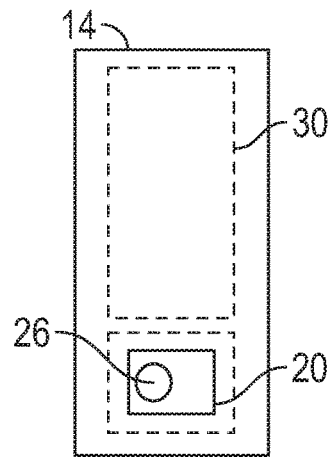
FIG. 6 is a front view of yet another set of high and low contact regions on the example touch sensitive display.

Referring to FIG. 6, another example embodiment is indicated where the initial touch 26 is substantially lower on the display 14 than the previous example embodiments. In this example, the initial touch 26 is generated at a lower portion of the display 14 such that a high contact region 28 is below the low contact region 30. Accordingly, this relationship of high contact region 28 to low contact region 30 results in a location of the input image 20 at a lower position of the display 14 to accommodate the operators.

Figure 7:
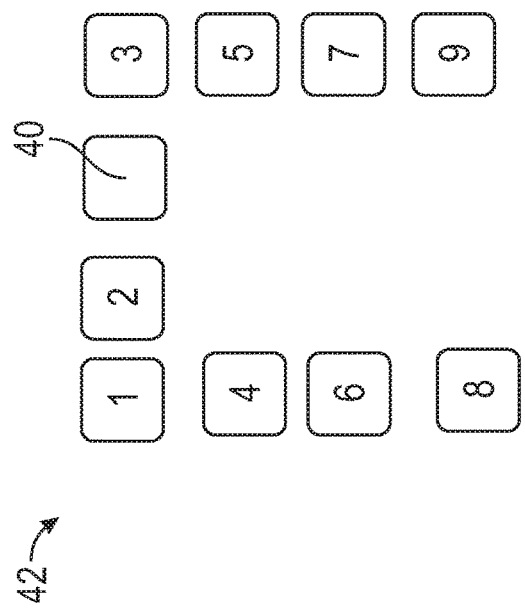
FIG. 7 is an example view of an example input image embodiment.

Referring to FIG. 7, an example input image is generated as a keypad 38. The keypad 38 can be generated with numerals or any other characters that may be utilized to provide a unique input code for the vehicle and operator. In this example, the keypad 38 includes numerals 1-8 and also includes blank keys 40.

Referring to FIGS. 1-6, operation of the example system 15 includes the generation of the input image on the display 14 in response to commands by the controller 34. The controller 34 obtains information indicative of a height of an operator. The determination of a height of the operator can be accomplished in one example through the use of an image 32 obtained by the camera 24. In another example embodiment, the height is ascertained by determining an area of high contact on the display 14 and an area of low contact and determining the approximate height of the operator based on a relationship between the area of high contact and the area of low contact. The relationship can include the size of the respective areas and/or a relative position of the areas on the display. The display 14 generates an input image 20 at a location that corresponds with the determined approximate height of the operator. The operator will then input a passcode that prompts the controller 34 to enable access by actuating the lock 36 or other locking features present within the vehicle. Moreover, although the lock 36 may be activated, acceptance of the passcode may also enable access to other features of the vehicle.

One consideration in generation of the input image 20 is to provide images that prevent unauthorized observance or determination of an input code. Accordingly, the example keypad 38 includes a random order of numerals. It should be appreciated that a standard numeric keypad can be observed from afar and that the movement of an operator in inputting a code can be ascertained from a distance based on an understanding of a numeric order and shape of standard keypads 38.

To combat and prevent such observations, the example keypad 38 includes a random order of numerals that prevents routine observation of an input passcode. In this example, the numeral keypad 38 does not include a sequential order of numerals. Additionally, the disclosed example indicated at 38 includes two "6"s. The additional numeral along with the lack of the numeral "9" disrupts any attempt at determining a passcode by observing input locations. Moreover, the example keypad 38 includes the blank keypads 40 that also disrupt and reduce the ability of casually observing an input code.

Figure 8:
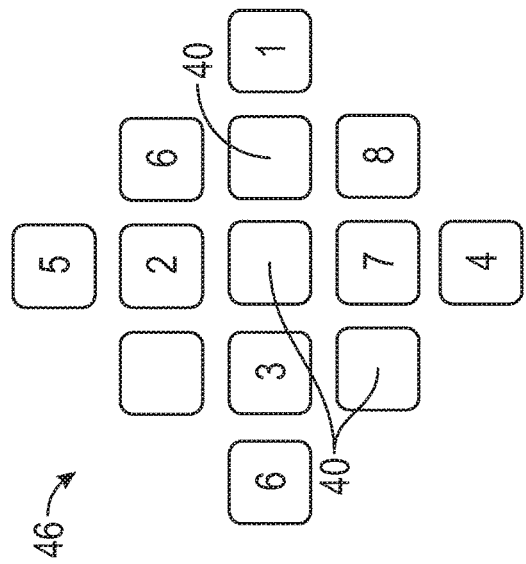
FIG. 8 is another example input image embodiment.

FIG. 8 illustrates another keypad configuration 42 that is arranged in a non-rectilinear pattern. Arrangement in a non-uniform or non-standard pattern also disrupts the ability of casual observance of an input code. In this example, the keypad is arranged as an upside down U shape. The numerals are also arranged in a non-uniform manner that makes observance by location of touches by an operator difficult. Moreover, in this example, blank keys are dispersed within the numerals of the keypad 38 to further disrupt any ability to casually observe or determine a code.

Figure 9:
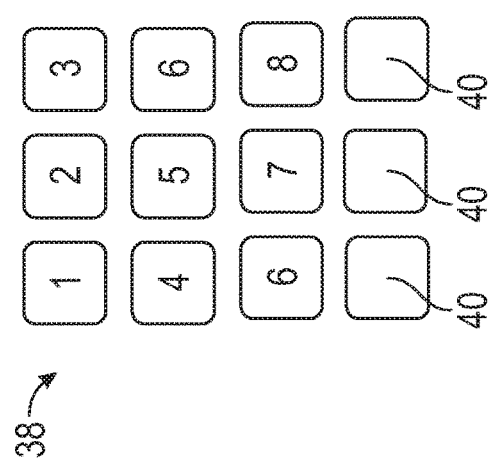
FIG. 9 is yet another example embodiment of an input image.

Referring to FIG. 9, another non-rectilinear and randomly ordered alphanumeric keypad 44 is schematically shown. The non-standard shape and random order of the keypad 44 disrupts any ability for observing possible input of codes. In this example, the keypad 44 is angled toward one side and includes randomly ordered numerals intermixed with blank keys 40.

Figure 10:
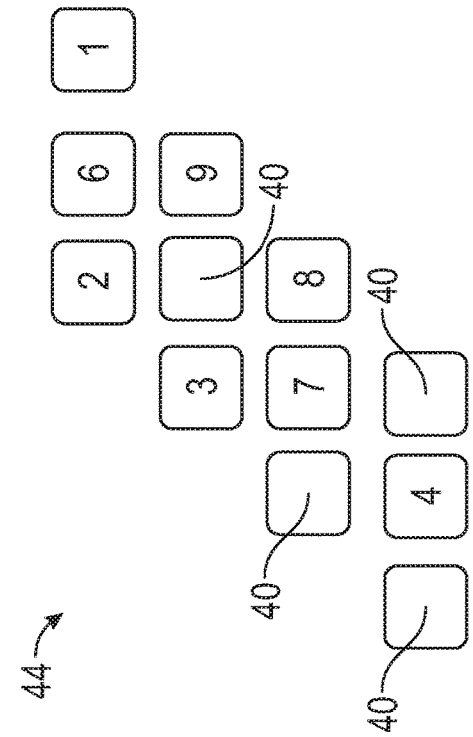
FIG. 10 is still another example input image embodiment.

Referring to FIG. 10, another keypad 46 is schematically shown and is orientated in another random geometric pattern. In this example, the keypad 46 is cross-shaped with randomly ordered numerals. The non-standard pattern disrupts the ability of any casual observance of an input code.

Each of the keypad patterns shown in FIGS. 7, 8, 9 and 10 can be operator selected. Moreover, the keypad pattern may be randomly selected by the controller 34 to further prevent any observance of a pattern that could serve to enable an outside observer to learn a passcode.

Figure 11:
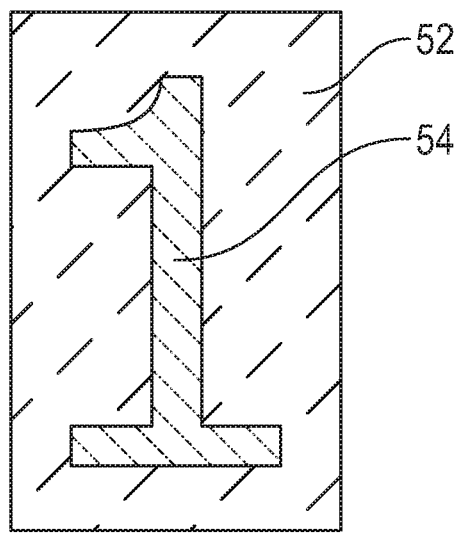
FIG. 11 is an example keypad character embodiment.
Figure 12:
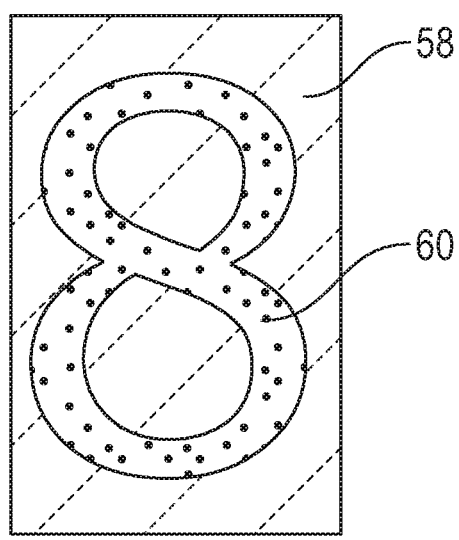
FIG. 12 is another example of a keypad character embodiment.

Referring to FIGS. 11 and 12, another security enhancement feature of the example display includes the use of background and character colors that substantially prevent the determination of a viewer not directly in front of the image of any of characters. In one disclosed example, a key 50 includes a background color 52 and a character color 54 that are selected to enhance the privacy of the display 14. The background color 52 and character color 54 are close shades of the same color. Close shades of color require more light to distinguish between the shades. The light at the display 14 would be sufficient to discern the shades and thereby identify the numeral. However, an increase in distance would reduce available light and thereby make the recognition of any numeral increasingly difficult.

Moreover, the background color and the character color may also be selected by a user to provide a customized color combination uniquely recognized by an operator. An operator may have the ability to discern between certain shades of one color, but be unable to ascertain different shades of another color. Accordingly, the character 56 includes a background shade 58 and character shade 60 that are user selected. The system 15 may provide a choice of different shade combinations, or enable a user to select each shades according to the operator preference. Moreover, the closeness of the background shade 58 and the character shade 60 for different colors could also be selectable to accommodate operators of different color discernment capabilities.

Accordingly, the example access control system 15 and touch sensitive display 14 includes features that adjust an input image to provide an optimum height for a specific user and also includes privacy enhancement features to prevent the observance of an access code.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An external keypad for a vehicle comprising:
    a display accessible from an external surface of the vehicle; and
    a controller receiving information indicative of a characteristic of an operator, wherein the controller governs operation of an input image generated on the display in response to the received information indicative of a characteristic of the operator and generates an access signal responsive to a predefined code input onto the input image, wherein the controller determines a height of the operator by determining an area of high contact on the display and an area of low contact and a hand shadow ratio between the areas of high contact and the area of low contact and uses the determined height information to govern operation of the input image.

2. The external keypad for a vehicle as recited in claim 1, wherein the input image is a keypad generated on the display.

3. The external keypad for a vehicle as recited in claim 2, wherein the keypad is generated with alphanumeric characters disposed in a non-sequential order.

4. The external keypad for a vehicle as recited in claim 2, wherein the keypad is generated with alphanumeric characters positioned in a non- rectilinear shape.

5. The external keypad for a vehicle as recited in claim 2, wherein keypad includes alphanumeric characters and at least one blank key.

6. The external keypad for a vehicle as recited in claim 2, wherein each key of the keypad includes a background color and an alphanumeric color that are selectable by the operator for reducing observability of a code input into the keypad other than the operator inputting a code.

7. The external keypad for a vehicle as recited in claim 2, wherein a height of the input image is adjusted according to the information indicative of the characteristic of the operator.

8. The external keypad for a vehicle as recited in claim 1, wherein the controller receives an image of an operator's face and determines a height of the operator based on the image of the operator's face.

9. A method of authorizing access to a vehicle comprising:
    mounting a touch sensitive display in a location accessible from an exterior of the vehicle;
    determining an area of high contact on the display and an area of low contact and determining the height of the operator based on a hand shadow ratio between the area of high contact and the area of low contact;
    generating an input image on the touch sensitive display with a controller responsive to information regarding a height of an operator; and
    enabling access to the vehicle responsive to inputting a proper code into the input image.

10. The method as recited in claim 9, including generating the input image on the display based on the height of the operator corresponding with the hand shadow ratio.

11. The method as recited in claim 9, including generating the input image to include alphanumeric characters disposed in at least one of a non-sequential order, a non-rectilinear shape and/or to include at least one blank key.

12. The method as recited in claim 9, including generating the input image to include a keypad that includes a background color and a character color that are selectable for reducing undesired observance of input into the keypad.

* * * * *